Feb. 23, 1960

J. C. MORGAN ET AL 2,925,633

MULTIPLE GLASS SHEET GLAZING UNITS

Filed Nov. 13, 1957

INVENTORS
John C. Morgan,
Roy W. Wampler,
Joseph D. Ryan and
Paul J. Mattimoe

BY Nobbe & Swope
ATTORNEYS

United States Patent Office 2,925,633
Patented Feb. 23, 1960

2,925,633

MULTIPLE GLASS SHEET GLAZING UNITS

John C. Morgan, Roy W. Wampler, Joseph D. Ryan, and Paul T. Mattimoe, Toledo, Ohio, assignors to Libbey-Owens-Ford Glass Company, Toledo, Ohio, a corporation of Ohio Application November 13, 1957, Serial No. 696,110

12 Claims. (Cl. 20—56.5)

This invention relates broadly to improvements in multiple glass sheet glazing units. More particularly, the invention contemplates a novel form of hermetically sealed multiple glass sheet glazing unit in which sheets of glass are maintained in spaced face-to-face relationship by metallic separating means that are bonded, through the intermediary of metallic coatings, to the glass sheets entirely around their marginal portions.

The metal separating means of the all glass and metal glazing units with which this invention is concerned combines with the glass sheets to create an air and moisture-tight space therebetween and to give a permanent structure that will reduce heat transfer and prevent condensation of moisture upon the faces of the glass sheets within the air and moisture-tight space.

Now all glass-metal glazing units of this general character have been produced commercially in accordance with the procedure set forth in the United States Patent No. 2,235,681 to C. D. Haven et al., issued March 18, 1941, and the success and efficiency of such glazing units is known to be largely due to the fact that the space between the two sheets of glass is hermetically sealed. This permits the use of dehumidified air, or even a slight vacuum in the air space, and improves the efficiency and insulating value of the units, while the metallic separator means with its metal to glass bond provides a highly satisfactory, effective, and long-lived vapor barrier.

However, when constructed as disclosed in the above-mentioned Haven et al. patent, for example, all of the edges and corners of the glass sheets are exposed, and the units have been found to be susceptible to breakage at these exposed glass areas if not carefully handled during shipment and installation. Moreover, such glass breakage often results in failure of the hermetic seal and is responsible for most of the replacement costs in such units.

It is therefore an object of this invention to provide an improved multiple glass sheet glazing unit having all of the good qualities of the presently available hermetically sealed all glass-metal units, and which is also adapted to successfully withstand the shock and strains of careless handling and long distance shipping in all kinds of carriers.

Another object of the invention is to provide a unitary structure of novel design so constructed that the edges of the glass sheets are cushioned and protected from damage due to shock.

Another object of the invention is to provide a novel structure which will substantially extend the life of the hermetically sealed space between the sheets of glass of the multiple glass sheet glazing unit.

Still another object of the invention is to provide novel means whereby the hermetic seal provided by the metallic separator means and metal to glass bond is substantially protected from corrosion due to moisture and breakage due to the formation of ice within the unit after installation.

Other objects and advantages of the invention will become more apparent during the course of the following description when taken in connection with the accompanying drawings.

In the drawings, wherein like numerals are employed to designate like parts throughout the same:

Briefly stated, according to the invention, the above-enumerated objects are accomplished, first, by providing a special protective metal channel around and over the edges of the unit; and second by introducing a special form of cushioning and adhesive layer between the metal channel and the glass sheets. Additionally, a vapor-resistant coating of novel composition is provided to cover the metallic separator means and, finally, there is provided a pressure compensating device in the shape of a closed resilient tubular or cellular member for insertion in the space defined by the metal separator, the margins of the glass sheets and the metal channel.

Figure 1:
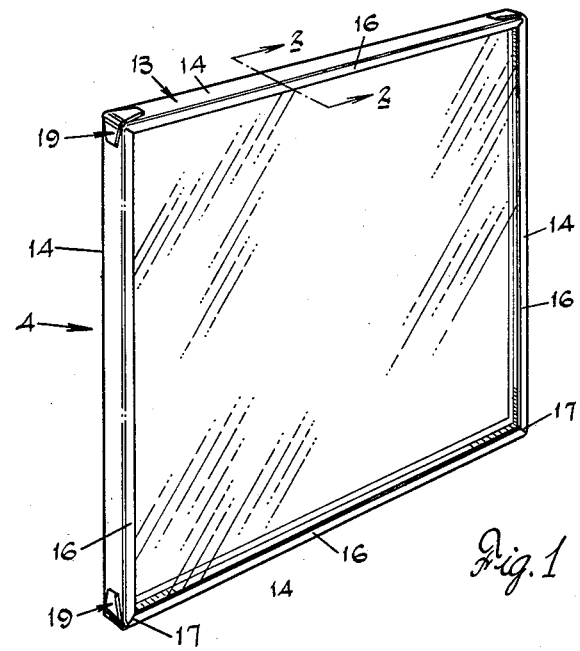
Fig. 1 is a perspective view of a multiple glass sheet glazing unit constructed in accordance with the invention.
Figure 2:
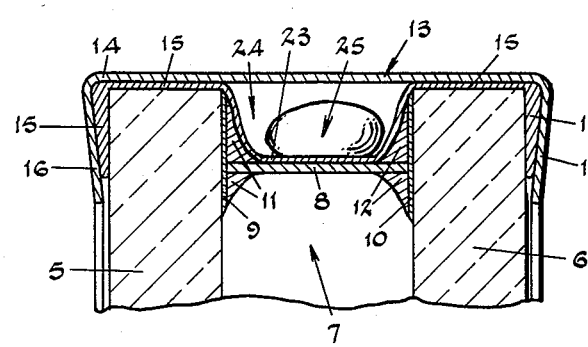
Fig. 2 is a vertical transverse sectional view taken on line 2—2 of Fig. 1.

With reference to the drawings and particularly to Figs. 1 and 2, there is disclosed a multiple glass sheet glazing unit, designated in its entirety by the numeral 4 and comprising two sheets or plates of glass 5 and 6 arranged in spaced, substantially parallel face-to-face relation to provide an air space 7 therebetween. This air space is closed, and further defined by a metal separator strip 8 arranged between the glass sheets inwardly of the edges thereof entirely around the unit, and bonded to the inner surfaces of the glass sheets 5 and 6 through the intermediary of metallic coatings 9 and 10 on the glass. The metal separator strip is bonded to the metallic coatings on the glass sheets by the solder fillets 11 and 12.

In order to protect the edges and corners of the glass sheets 5 and 6, there is positioned over and around the periphery of the unit a special metal frame 13. This frame is formed of a plurality of channel members 14 that are bonded to the glass sheets and cushioned therefrom by a layer 15 of a high molecular weight organic polymer-clay composition. The spaced flanges 16 of channel members 14 abut the outwardly directed surfaces of the glass sheets. Each channel member is preformed and, with the adjacent members, form a joint 17 at each of the corners of the unit.

Figure 4:
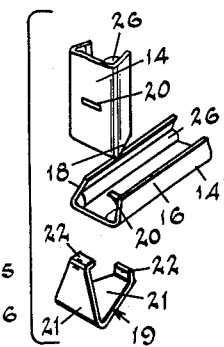
Fig. 4 is an exploded perspective of the channel members and one of the corner closure clips.

The channel members 14, when positioned on the glazing unit 4, may be effectively maintained in a substantially rigid and permanent assembly by means of a securing member adapted to connect the adjacent mitered ends 18 thereof. For this purpose, there is provided a securing corner clip 19, the ends of which are received in slots 20 formed in the webs of the channel members 14 adjacent the ends thereof. As shown in Fig. 4, the securing clip 19 has leg portions 21 arranged at substantially right angles to one another and the end of each leg is bent and shaped to provide a hooked end or tongue 22. Thus, when the channel members are arranged as diagrammatically shown in Fig. 4, or on the unit 4 of Fig. 1, the hooked ends or tongues 22 of the clips are inserted into the slots 20 thereby firmly connecting the ends of the adjoining channel members 14 together.

Prior to assembling the channel members 13 in place, a high molecular weight organic polymer-microcrystalline wax coating composition is spread over the metallic separator 8 and the solder fillets 11 and 12 to form a moisture resistant film 23 that will protect the metal from any moisture which may collect.

The moisture resistant film 23 is preferably a polyisobutylene polymer microcrystalline wax mixture in which the wax and polymer are added in equal portions. It is possible to vary the proportion of each constituent in the mixture in the range of 25 parts to 75 parts per 100 parts by weight and still maintain the effectiveness of the composition. The polyisobutylene polymer preferably has a molecular weight in the range of 10,000 to 15,000. This composition has been found to be highly desirable as a vapor barrier as it effectively prevents moisture from coming in contact with the metallic separator strip 8 and metal fillets 11 and 12 and also is readily applied as it forms a homogeneous liquid on heating.

A problem of electrolytic corrosion arises with any unit composed of different types of metals having different potentials where there is a possibility of the presence of moisture coming in contact with the unit. In addition to preventing electrolytic corrosion by acting as a vapor barrier the polyisobutylene polymer microcrystalline wax film 23 does not break down on contact with moisture into either acids or bases but remains inert. This property is highly advantageous over compositions which do break down into acids or bases in the presence of moisture in that such acids or bases produce corrosion of the metal bonding components. Although the function of this coating is primarily to keep moisture from contact with the metallic separator strip and metal fillets, the polyisobutylene polymer microcrystalline wax composition is additionally especially well adapted for this purpose because of its inert properties in the presence of moisture. Other resinous coating compositions having the desired moisture resistant qualities may be used if desired, however their inertness in the presence of moisture should be considered in addition to their moisture resistant properties.

Positioned at each edge of the unit in the space 24 defined by the metal frame 13, the glass sheets 5 and 6, and the separator strip 8 is a flexible polyethylene tube 25 which is sealed at both ends. The overall length of the tube is preferably slightly shorter than the length of the respective side of the unit.

The purpose of the sealed tube 25 of polyethylene is to protect the unit from extreme pressures which might be built up therein should moisture be present within the space 24 under freezing conditions. The resilience of the tube acts to absorb any pressure built up within the unit through ice formation, thereby relieving the metal separator strip from these pressures. In addition to being resilient, it has been found that polyethylene is particularly well adapted for this function as it is inert in the presence of moisture and will not deteriorate in the unit during its expected period of use. Alternative to sealing the tube at each end, a continuous length of tubing may be sealed at predetermined intervals, i.e. every two inches, before cutting the tube to predetermined lengths. While a flexible tube of polyethylene is preferred, other similar materials could be used equally as well. Thus foamed butyl rubber which has air occluded within its cells would give a similar compression thereby relieving the structure from undue pressure.

Figure 3:
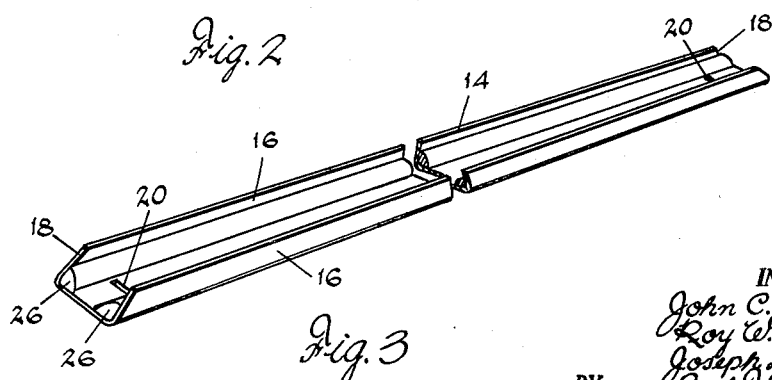
Fig. 3 is a perspective view of a section of the protective channel member of Fig. 1 prior to its being placed on the unit, and showing beads of cushioning material positioned therein.

Referring now to Fig. 3, a single channel member 14 is shown in perspective, with beads 26 of a bonding and cushioning material positioned therein. As stated above, the channel members form a protective metallic layer around the perimeter of the glazing unit whereby the edges of the glass sheets are protected against cracking or chipping during handling and shipping. Any suitable metal such as stainless steel or aluminum may be used in forming the channels, although aluminum is preferable for reasons hereinafter stated. The channels are initially preformed into continuous lengths with slightly crimped flanges 16. Before fabrication they are cut to the desired length and the ends 18 thereof mitered.

The channel members are then passed in relation to an extrusion tool and the two beads 26 of a plastic material are extruded into position, as shown in Fig. 3, approximately ⅛ inch in from and parallel to the flanges 16. When the channel members are applied to the edges of the unit, the beads 26 are compressed between the channel and edges of the glass sheets to form the cushioning and adhesive layer 15 between the channel member and the glass sheets. Thus, the glass sheets are additionally protected as the cushioning layer takes up any shock which may be imparted to the outer metallic channel member. Additionally, the cushioning layer serves to adhere the metal channel in position.

The bead 26 and thus the cushioning layer 15 are preferably formed of a mixture of polyisobutylene polymer and finely divided clay filler with a small amount of aluminum oleate added as a stabilizer. Compositions consisting of 50 parts by weight of polyisobutylene polymer, 50 parts by weight of clay filler and 2 parts by weight of aluminum oleate have been found to be highly satisfactory, however the range of polyisobutylene polymer in the mixture may be varied from 35 to 65 parts by weight per 100 parts, the clay being varied between 65 parts and 35 parts by weight. Effective stabilization is achieved when 2 parts by weight of aluminum oleate is added per 100 parts although up to 5 parts by weight has also been found to be effective. In addition to aluminum oleate other metallic salts of fatty acids such as aluminum stearate, aluminum palmitate, etc. may also be used.

Other finely divided inorganic fillers may be used, if desired, in place of some or all of the clay in the cushioning and adhesive mixture. Finely divided inert clay filler is shown as being the preferred filler material primarily because of its chemical inertness when used in combination with the polyisobutylene polymer. Further, the resulting mixture has an infinite electrical resistance thereby inhibiting any electrolytic corrosion.

The function of the aluminum oleate in the mixture, as above-stated, is that of a stabilizer. It has been found that polyisobutylene polymer clay filler mixtures on standing for excessive lengths of time, especially in contact with moisture, will be subject to physical disintegration. The addition of the stabilizer herein provided effectively prevents any disintegration from taking place.

The polyisobutylene polymer used in the adhesive and cushioning layer 15 may have a molecular weight in the range of 10,000 to 70,000 depending on the flow characteristics desired in the mixture. The use of a polyisobutylene polymer having a molecular weight in the range of 20,000 to 25,000 has proved to be preferable and results in an adhesive and cushioning mixture remarkably suited to this particular combination and purpose from every standpoint.

In fabricating the above described unit, the metallic coatings 9 and 10 are first applied to the glass sheets 5 and 6 and the metal separator 8 secured thereto as disclosed in U.S. Patent No. 2,235,681 after which the vapor resistant coating 23 is applied to the metallic separator strip 8 and the solder fillets 11 and 12. A flexible tube 25 of polyethylene, sealed at both ends, is then positioned lengthwise between the glass sheets and abutting the metal separator strip 8. The metal channel members 14 with the cushioning beads 26 positioned therein are then applied over the outer edges of the glass sheets and forced into a final position as shown in Fig. 1 after which the securing clips 19 are forced into engagement with adjoining channel members at each corner of the unit as described hereinbefore.

Table I which follows shows the results of a series of shock tests to which a series of multiple glass sheet glazing units were subjected. In this series of tests, a pendulum type testing unit was used which consisted of a hammer head, an arm attached thereto and pivoted at the opposite end thereof, and a holder for positioning each unit to be tested so that the hammer head would strike the edge of the unit flush at a point directly beneath the point at which the opposite end of the arm was attached.

The force with which the hammer head struck each unit was calculated from the weight of the hammer head, the length and weight of the arm and the distance through which the arm traveled. Each unit was struck with such a force as would crack or chip the glass edges.

The following table shows the type of units which were tested and the force required to crack or chip the glass edges of each unit. The following results are based on an evarge of four units per type tested.

*Table I*

| Type of Unit a | Adhesive Cushioning Layer Composition b | Average Force (foot pounds/sec.²) |
|---|---|---|
| 1 | none | 135 |
| 2 | A | 815 |
| 3 | B | 757 |
| 4 | C | 745 | a 1. All glass-metal multiple sheet glazing units with no edge protection. 2-4. All glass-metal multiple sheet glazing units having the edge protection described above.
b A. 50 parts polyisobutylene, 50 parts finely divided clay, 2 parts aluminum oleate. B. 55 parts polyisobutylene, 45 parts finely divided clay, 2 parts aluminum oleate. C. 60 parts polyisobutylene, 40 parts finely divided clay, 2 parts aluminum oleate.

As clearly indicated by the results in Table I, the units provided with the edge protection of this invention were from 5½ to 6 times more resistant to shock than the unprotected, prior art units.

As stated above, the metallic channel members are preferably formed of aluminum. The reason for this is that aluminum provides an additional protection for the metallic seal in the presence of moisture because aluminum is preferentially attacked by moisture and thereby retards corrosion of the metal seal itself. Too, edge protection from shock is greater with aluminum than with other metals such as stainless steel or low chromium steel alloys of the same thickness.

The novel multiple glass sheet glazing unit above-described provides numerous advantages over the conventional hermetically sealed all-glass units now available. Thus, the edges of the glass sheets are doubly protected from shocks in handling by the use of the metal channel members 14 with the cushioning layer 15 positioned therebetween. Additionally, the metal separator strip and the metal to glass bonds are protected from moisture within the unit by the moisture resistant coating 23. Also, in the presence of ice formation within the unit, the all metallic vapor barrier is protected against excess pressure by the compressible tubular member 25 which will act to take up any excess pressure brought about by ice formation.

Although multiple glass sheet glazing units comprising two glass sheets have been described hereinbefore as a preferred embodiment, multiple glass sheet glazing units of three or more sheets fall within the scope of the above-described invention.

It is thereby understood that the form of the invention herewith shown and described is to be taken as the preferred embodiment of the same and that various changes in the shape, size, and arrangement of parts may be resorted to without departing from the spirit of the invention or the scope of the subjoined claims.

We claim:

1. A multiple glass sheet glazing unit comprising a plurality of parallel sheets of glass spaced apart by metallic separator means bonded through intermediary metallic coatings to the inner margins thereof, an inert resilient material, having air contained therein, spaced between said glass sheets outwardly of said metallic separator means, a metallic channel member positioned over the edge portions of the outermost sheets of glass, and a resilient adhesive and cushioning layer positioned between said channel member and the edge of said glass sheets.

2. A multiple glass sheet glazing unit of the construction of claim 1 in which a moisture-resistant film comprising a high molecular weight polyisobutylene-microcrystalline wax composition is provided over said metallic separator means and glass to metal bonds.

3. A multiple glass sheet glazing unit of the construction of claim 1 in which the metallic channel member is an aluminum channel.

4. A multiple glass sheet glazing unit of the construction of claim 1 in which the metallic channel member is an aluminum channel and in which the resilient adhesive and cushioning layer is a stabilized high molecular weight polyisobutylene polymer finely divided inert clay composition.

5. A multiple glass sheet glazing unit of the construction of claim 1 in which the inert resilient material consists of organic tubular material which is sealed so as to occlude the air within the confining walls of the tube.

6. A multiple glass sheet glazing unit of the construction of claim 1 in which the inert resilient material consists of foamed organic material which has air occluded within the cells.

7. In combination with a multiple glass sheet glazing unit, comprising a plurality of parallel sheets of glass spaced apart by metallic separator means positioned inwardly of the edges of the glass sheets and around the marginal portions thereof, metallic channel members positioned over the edge portions of the outermost sheets of glass, a resilient adhesive and cushioning layer positioned between said channel members and the edges of said glass sheets, and securing members connecting the adjacent ends of said channel members, said securing members comprising clips having end portions in engagement with end portions of said channel members.

8. In combination with a multiple glass sheet glazing unit comprising a plurality of parallel sheets of glass spaced apart by metallic separator means positioned inwardly of the edges of the glass sheets and around the marginal portions thereof, a metallic frame positioned over the edge portions of the outermost sheets of glass, and a resilient adhesive and cushioning layer positioned between said frame member and the edges of said glass sheets, in which the resilient adhesive and cushioning layer comprises a polyisobutylene polymer having a molecular weight of from 10,000 to 70,000, a filler of finely divided clay, and a metallic salt of a fatty acid as stabilizer.

9. A multiple glass sheet glazing unit, comprising a plurality of parallel sheets of glass spaced from one another, separator means positioned between the glass sheets adjacent to but inwardly of the peripheral edges thereof to maintain said sheets in spaced relation, protective means covering the edges of the glass sheets and enclosing the space outwardly of said separator means, and a member of inert resilient material, having air contained therein, positioned within the space between said separator means and said protective cover means.

10. A multiple glass sheet glazing unit, as claimed in claim 9, wherein the member of inert resilient material comprises a plastic tube.

11. A multiple glass sheet glazing unit as claimed in claim 9, wherein the protective cover means comprises a channel member fitting over the edge portions of the glass sheets.

12. A multiple glass sheet glazing unit, comprising a plurality of parallel sheets of glass spaced apart by a metallic separator strip bonded to metallic coatings on the inner marginal edge portions of said sheets and spaced inwardly from the peripheral edges of the glass sheets, a plastic tube, having air contained therein, disposed between the glass sheets outwardly of said separator strip, and a protective channel member positioned over the edge portions of the glass sheets.

References Cited in the file of this patent

UNITED STATES PATENTS

| | | |
|---|---|---|
| 2,235,680 | Haven et al. | Mar. 18, 1941 |
| 2,684,266 | Englehart | July 20, 1954 |